United States Patent
Franyie Quintana et al.

(10) Patent No.: US 12,335,730 B2
(45) Date of Patent: Jun. 17, 2025

(54) ACCEPTING OR REJECTING A DATA MESSAGE IN A VEHICLE NETWORK

(71) Applicant: Ford Global Technologies, LLC, Dearborn, MI (US)

(72) Inventors: Humberto Eduardo Franyie Quintana, Westland, MI (US); Daniel Aaron Zajac, Carleton, MI (US); Jiguo Song, Plymouth, MI (US); Xin Ye, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1073 days.

(21) Appl. No.: 16/662,449

(22) Filed: Oct. 24, 2019

(65) Prior Publication Data

US 2021/0127268 A1  Apr. 29, 2021

(51) Int. Cl.
*H04W 12/08* (2021.01)
*G07C 5/00* (2006.01)
*G07C 5/08* (2006.01)
*H04W 4/40* (2018.01)
*H04W 12/68* (2021.01)

(52) U.S. Cl.
CPC ............ *H04W 12/08* (2013.01); *G07C 5/008* (2013.01); *G07C 5/0808* (2013.01); *H04W 4/40* (2018.02); *H04W 12/68* (2021.01); *G07C 2205/02* (2013.01)

(58) Field of Classification Search
CPC ....... H04W 12/08; H04W 4/40; H04W 12/68; G07C 5/008; G07C 5/0808; G07C 2205/02

USPC .......................................................... 726/26
See application file for complete search history.

(56) References Cited

U.S. PATENT DOCUMENTS

| | | | |
|---|---|---|---|
| 6,242,873 B1 * | 6/2001 | Drozdz | B60L 15/2045 180/65.245 |
| 6,314,351 B1 | 11/2001 | Chutorash | |
| 6,550,012 B1 | 4/2003 | Villa et al. | |
| 7,484,008 B1 | 1/2009 | Gelvin et al. | |
| 7,509,673 B2 | 3/2009 | Swander et al. | |
| 7,596,806 B2 | 9/2009 | Chen | |
| 7,941,551 B2 | 5/2011 | Anantharaman et al. | |
| 8,516,033 B2 | 8/2013 | Ellis, III | |
| 8,701,175 B2 | 4/2014 | Edwards et al. | |
| 8,732,230 B2 | 5/2014 | Ellis, III | |
| 8,782,771 B2 | 7/2014 | Chen et al. | |
| 8,955,100 B2 | 2/2015 | Varadhan et al. | |
| 9,071,974 B2 | 6/2015 | McKay et al. | |

(Continued)

FOREIGN PATENT DOCUMENTS

| | | |
|---|---|---|
| CN | 105553946 A1 | 5/2016 |
| CN | 105871830 A | 8/2016 |

(Continued)

*Primary Examiner* — Bryan F Wright
(74) *Attorney, Agent, or Firm* — Christopher Storms; Brooks Kushman P.C.

(57) ABSTRACT

A method is disclosed; the method may comprise: receiving, at each of a plurality of network computers, a security message from a gateway computer, wherein the security message identifies a current mode of the vehicle, wherein the current mode is indicative of a vehicle state; storing the current mode; receiving a data message; and based on the current mode, determining whether to accept the data message.

20 Claims, 3 Drawing Sheets

(56) References Cited

U.S. PATENT DOCUMENTS

| | | | |
|---|---|---|---|
| 9,560,071 B2 | 1/2017 | Ruvio et al. | |
| 9,635,006 B2 | 4/2017 | Oz et al. | |
| 9,868,418 B2 * | 1/2018 | Weinfurther | B60R 25/1001 |
| 10,055,904 B2 | 8/2018 | Miller et al. | |
| 10,057,292 B2 * | 8/2018 | Molter | G06F 12/00 |
| 10,313,884 B2 | 6/2019 | Mohrmann et al. | |
| 2002/0078198 A1 | 6/2002 | Buchbinder et al. | |
| 2006/0226965 A1 * | 10/2006 | Mizutani | G01R 31/007 |
| | | | 340/439 |
| 2007/0022479 A1 | 1/2007 | Sikdar et al. | |
| 2008/0033609 A1 * | 2/2008 | Razavi | G01M 17/00 |
| | | | 701/31.4 |
| 2014/0002015 A1 * | 1/2014 | Tripathi | B60L 53/63 |
| | | | 320/108 |
| 2017/0341604 A1 | 11/2017 | Ben Noon et al. | |
| 2017/0366521 A1 | 12/2017 | Lei et al. | |
| 2018/0205703 A1 | 7/2018 | Grau | |
| 2018/0219878 A1 | 8/2018 | Hirshberg et al. | |
| 2018/0227306 A1 | 8/2018 | Borkowicz et al. | |
| 2019/0071056 A1 | 3/2019 | Choi | |
| 2019/0265965 A1 * | 8/2019 | Acharya | G06F 8/658 |

FOREIGN PATENT DOCUMENTS

| | | | | |
|---|---|---|---|---|
| DE | 102017113435 A1 * | 12/2017 | | G07C 5/02 |
| EP | 3316524 A1 * | 5/2018 | | H04L 12/40032 |
| GB | 2430585 A | 3/2007 | | |
| GB | 2548371 A | 9/2017 | | |
| WO | WO-2013144962 A1 * | 10/2013 | | G06F 21/604 |
| WO | 2018162176 A1 | 9/2018 | | |

\* cited by examiner

ACCEPTING OR REJECTING A DATA MESSAGE IN A VEHICLE NETWORK

BACKGROUND

More and more vehicles are furnished with equipment enabling extra-vehicular communication. These communications may provide a path for unauthorized users—external to the vehicle—to alter the programming of onboard vehicle computers.

DETAILED DESCRIPTION

A system may comprise: a plurality of network computers communicatively coupled to a gateway computer and one another via a local network in a vehicle, wherein each of the plurality of network computers comprise: one or more processors; and memory storing first instructions executable by the one or more processors, the first instructions comprising to: receive, via the local network, a security message from the gateway computer that identifies a current mode of the vehicle, wherein the current mode is indicative of a vehicle state; store the current mode; receive a data message; and based on the current mode, determine whether to accept the data message.

According to the at least one example set forth above, the current mode is one of a plurality of predetermined modes.

According to the at least one example set forth above, the data message is received either via the local network or from an out-of-local-network computer.

According to the at least one example set forth above, a communication device is communicatively coupled to local network via a diagnostic port.

According to the at least one example set forth above, determining whether to accept the data message further is based on a type of the data message.

According to the at least one example set forth above, the type of the data message is one of: a diagnostic (any) type, an operational (any) type, an on-vehicle telematics protocol (OVTP) (any) type, a network management (any) type, a diagnostic read-out only type, a diagnostic all-except read-out only type, a new program key type, an operational read-out only type, an operational all-except read-out only type, an OTVP read-out only type, an OTVP all-except read-out only type, a network management read-out only type, a network management all-except read-out only type, a diagnostic predetermined use case type, or a diagnostic all-except predetermined use case type.

According to the at least one example set forth above, the first instructions further comprise, to accept the data message when the type is one of a diagnostic (any) type, a diagnostic read-out only type, a new program key type, or a diagnostic predetermined use case type regardless of the current mode.

According to the at least one example set forth above, the vehicle state one of: vehicle is stationary and vehicle power is ON; vehicle is moving and vehicle power is ON; or vehicle is stationary and power is OFF.

According to the at least one example set forth above, the vehicle state is one of: a grace period state or an in-motion state wherein the vehicle is in motion and a predetermined assembly-line tool or a predetermined vehicle dealership tool is permitted to communicate with at least one of the plurality of network computers.

According to the at least one example set forth above, receiving the data message comprises to: read a header or footer of the data message.

According to the at least one example set forth above, determining to accept the data message comprises to: read a payload of the data message, store at least a portion of the payload message, execute data stored in the payload of the data message, or a combination thereof.

According to the at least one example set forth above, determining whether to accept the data message further is based on a type of the data message, wherein the first instructions further comprise to: determine that the current mode indicates that the vehicle is stationary and that vehicle power is ON; determine that the type is a diagnostic (any) type, an operational (any) type, an on-board telematics protocol (OTVP) (any) type, or a network management (any) type; and then accept the data message.

According to the at least one example set forth above, further comprising the gateway computer, wherein the gateway computer comprises: one or more second processors; and second memory storing second instructions executable by the one or more second processors, the second instructions comprising to: receive at least one indication regarding whether the vehicle is stationary or moving and whether vehicle power is ON or OFF; determine the current mode based on the at least one indication; and provide, to the plurality of network computers, the security message which includes the current mode.

According to the at least one example set forth above, the second instructions further comprise to: receive the data message from a communication device; and pass-through the data message to the plurality of network computers.

According to the at least one example set forth above, the second instructions further comprise to: before passing-through the data message, scan the data messages using a firewall program stored in second memory of the gateway computer.

According to at least one additional illustrative example, a method is described that comprises: receiving, at each of a plurality of network computers, a security message from a gateway computer, wherein the security message identifies a current mode of a vehicle, wherein the current mode is indicative of a vehicle state; storing the current mode; receiving a data message; and based on the current mode, determining whether to accept the data message.

According to the at least one method example set forth above, the security message is received by each of the plurality of network computers via a local network, wherein a communication device is communicatively coupled to the local network via a diagnostic port.

According to the at least one method example set forth above, determining whether to accept the data message further is based on a type of the data message.

According to the at least one method example set forth above, the vehicle state one of: vehicle is stationary and vehicle power is ON; vehicle is moving and vehicle power is ON; or vehicle is stationary and power is OFF.

According to the at least one method example set forth above, the vehicle state is one of: a grace period state or an in-motion state wherein the vehicle is in motion and a predetermined assembly-line tool or a predetermined vehicle dealership tool is permitted to communicate with at least one of the plurality of network computers.

According to the at least one example set forth above, a computing device comprising at least one processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Turning now to the figures, wherein like reference numerals indicate like or similar features and/or functions, a communication system 10 for a vehicle 12 is shown that increases vehicle security by adding security functionality both at a gateway computer 14, as well as at each of a plurality of network computers 16, 18, 20, 22, wherein the gateway computer 14 and other network computers 16-22 form a local network 30 (also sometimes called a local area network). In this manner (and as described more below), the gateway computer 14 may utilize a primary security function (e.g., as a gatekeeper to the local network 30; e.g., implementing a firewall functionality as a portal thereto) and each network computer 16-22 may utilize a secondary security function (e.g., each programmed with a separate firewall functionality). In this manner, regardless of whether a data message is received from or via the gateway computer 14 (and via local network 30—e.g., a front-door message) or whether a data message is received via a direct or indirect communication with a different onboard vehicle computer (e.g., from or via an out-of-local-network computer 32 and not via the local network 30—e.g., a back-door message), data security of the respective network computer(s) 16, 18, 20, 22 is enhanced. As explained more below, as a state of the vehicle 12 changes, the gateway computer 14 may instruct the other network computers 16-22 of one of a plurality of predetermined modes, and each of the network computers 16-22 may store this current mode. As the state of the vehicle 12 changes, the gateway computer 14 may update each of the network computers 16-22 with the current mode (e.g., different than the previous mode). When a data message is received by the network computers 16-22 (e.g., either a front-door message or a back-door message), the network computers 16-22 may determine whether to accept (e.g., read and/or execute) the contents of the data message depending on a type of the data message and the current mode. This process will be described in greater detail following a description of the elements shown in FIG. 1.

Figure 1:
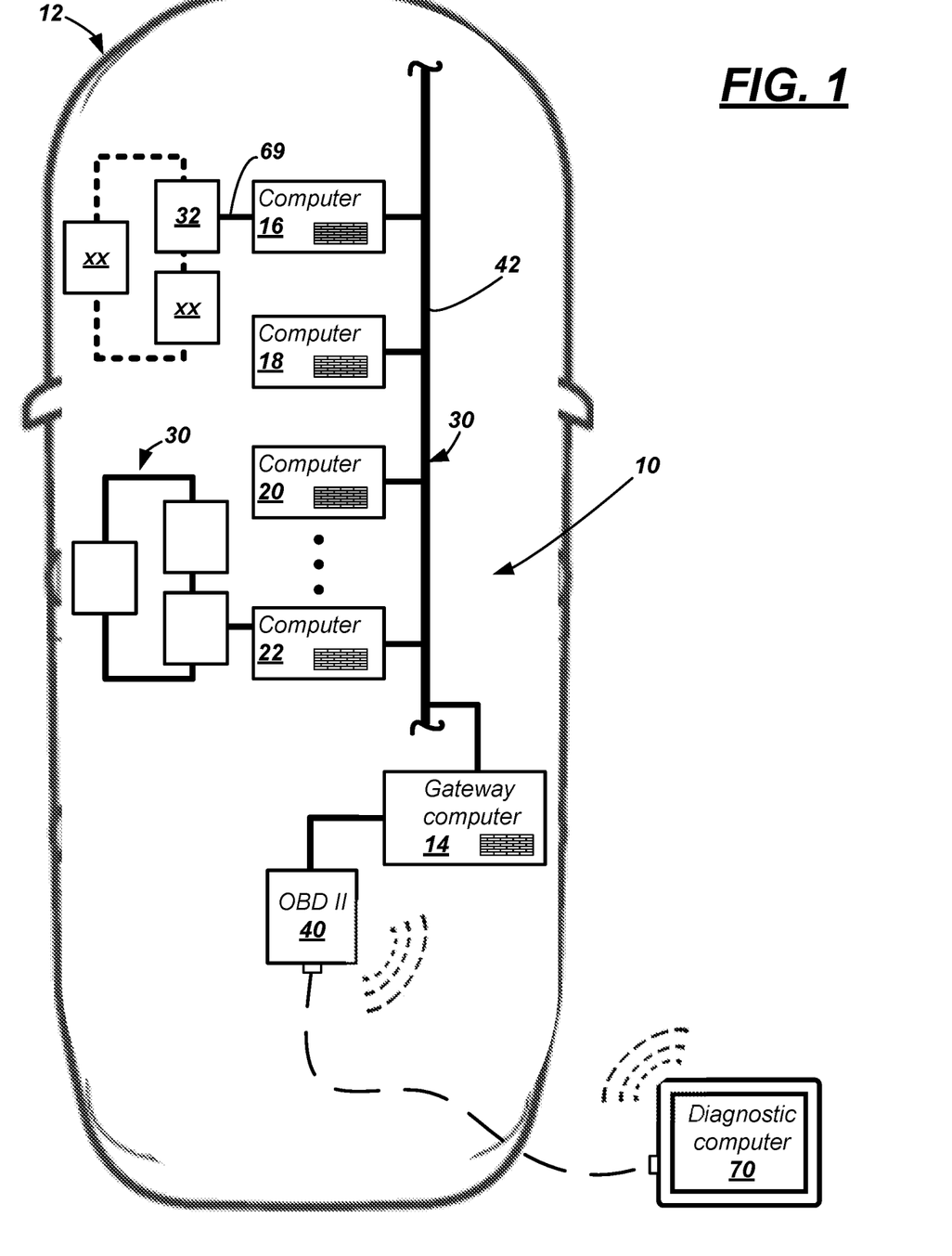
FIG. 1 is a schematic diagram of a vehicle communication system that comprises a local network comprising a gateway computer and other communicatively-coupled network computers.

The illustrated vehicle 12 in FIG. 1 is a passenger vehicle; however, this is merely one example. Vehicle 12 instead could be a truck, a sports utility vehicle (SUV), a recreational vehicle, a bus, a marine vehicle, an aircraft, or any other suitable vehicle that comprises communication system 10.

Communication system 10 may comprise the local network 30, one or more computing devices (e.g., such as computer 32), and a diagnostic port 40. Each will be discussed in turn.

As described above, local network 30 may comprise gateway computer 14, the plurality of network computers 16-22, and a network link 42. According to at least some examples, the hardware of gateway computer 14 and network computers 16-22 may be similar or the same. Thus, the hardware of only one (the gateway computer 14) will be described in detail below. However, the software, firmware, or other instructional code or programming of each device (simply referred to as 'instructions' herein) may vary; similarly, the various sensors and other electronics to which each computer may be communicatively coupled also may vary. Non-limiting examples of instructions executable by the various networked computers also follows.

Gateway computer 14 is also a networked computer (part of local network 30) and serves a gatekeeping function to local network 30. For example, the gateway computer 14 may be positioned between the network computers 16-22 and other computing devices onboard vehicle 12. In some examples, gateway computer 14 may be communicatively coupled to or even be a vehicle telematics device (e.g., capable of long-range and/or short-range wireless communication with devices outside of the vehicle). In other examples, gateway computer 14 may be communicatively coupled to a human-machine interface (HMI) device such as a vehicle head unit or the like (also not shown). And in at least one example, the gateway computer 14 is communicatively coupled to the diagnostic port 40. Other examples also exist. Accordingly, gateway computer 14 may be uniquely positioned to control the flow of messages between an extra-network electronic device (perhaps, extra-vehicle electronic device) and one or more of the network computers 16-22.

Figure 2:
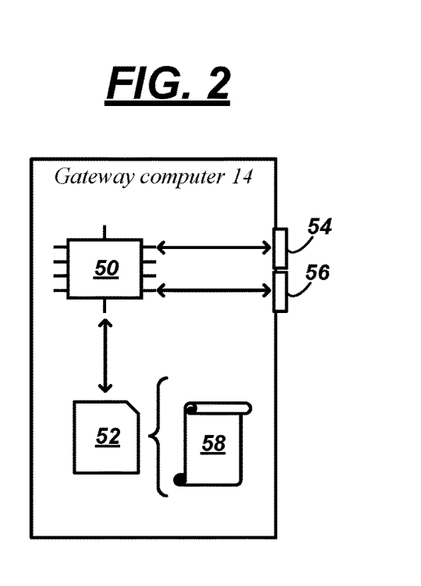
FIG. 2 is a schematic diagram illustrating an example of the gateway computer.

As shown in FIGS. 1-2, gateway computer 14 may comprise one or more processors 50 (only one is shown for purposes of illustration), memory 52, and one or more communication ports 54, 56. Processor(s) 50 may be programmed to process and/or execute digital instructions to carry out at least some of the tasks described herein. Non-limiting examples of processor(s) 50 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 50 read from memory 52 and execute one or more sets of instructions (e.g., computer programs) which may be embodied as a computer program product stored on a non-transitory computer-readable storage medium (e.g., such as memory 52). According to the illustration, some instructions 58 executable by processor(s) 50 include serving as a firewall to the local network 30 and permitting diagnostic communications between the network computers 16-22 and diagnostic port 40. Other non-limiting examples of instructions 58 will be described below in the processes illustrated using flow diagrams, wherein these and other instructions may be executed in any suitable sequence unless otherwise stated. These instructions and the example processes described below are merely embodiments and are not intended to be limiting.

Memory 52 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 52 may store one or more sets of instructions (e.g., such as instructions 58) which may be embodied as software, firmware, or other programming instructions executable by the processor(s) 50—including but not limited to the instruction examples set forth herein. In operation, processor(s) 50 may read data from and/or write data to memory 52.

Two communication ports 54, 56 are shown in FIG. 2; however, this is merely an example. More or fewer quantities of ports can be used in other examples. According to the illustrated example, port 54 may connect processor(s) 50 to local network 30, and port 56 may connect processor(s) 50 to diagnostic port 40. Thus, according to one example, data being sent over the local network 30 may be partitioned in hardware. Again, this is merely an example and not required in all examples.

As described above, instructions 58 may be stored on memory 52 and may be executable by processor(s) 50. Instructions 58 may comprise any suitable commands which enable the gateway computer 14 to employ firewall instructions to filter data messages that may be received from outside the local network 30—e.g., wherein an intended recipient device is one of the networked computers 16-22. Thus, in some instances, gateway computer 14 may pass-through messages to the networked computers 16-22, and in other instances, gateway computer 14 may determine to block and/or to not pass-through such messages. Thus, gateway computer 14 may be programmed to filter out potentially undesirable messages—not permitting such data messages to reach the networked computers 16-22 via the network link 42. Furthermore, as described more below, gateway computer 14 may determine a current mode of the vehicle 12 and provide the current mode to the networked computers 16-22. As described in a process 400 below, the networked computers 16-22 may use the current mode to determine whether to accept a received message.

Figure 3:
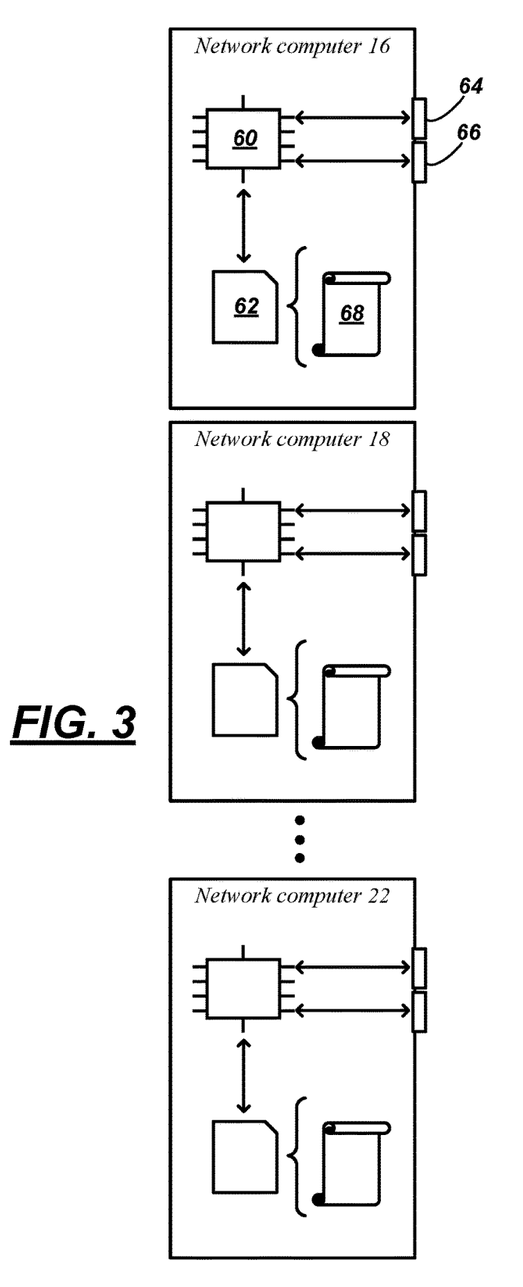
FIG. 3 is a schematic diagram illustrating an example of the network computers.

Turning now to the plurality of network computers 16-22, FIGS. 1 and 3 illustrate an example. As discussed above, according to at least one example, the hardware of any of network computers 16-22 may be similar to or the same as the hardware of gateway computer 14. Thus, the hardware of the networked computers (e.g., network computer 16)—e.g., one or more processors 60, memory 62, and one or more communication ports 64, 66—are not re-described in detail. Accordingly, it should be appreciated that the hardware of one the processor(s) 60 may be similar or the same as processor(s) 50, the hardware of memory 62 may be similar or the same as memory 52, and the port(s) 64, 66 may be similar or the same as port(s) 54, 56. In the case of the port(s), port 64 may be connected to local network 30, and port 66 (if it exists) may be connected to sensors, an out-of-local-network computer (e.g., such as computer 32), or the like.

Instructions 68 may be stored on memory 62 and may be executable by processor(s) 60. Instructions 68 may comprise any suitable commands which enable the respective network computer (e.g., network computer 16) both carry out a vehicle function, as well as to employ firewall instructions to further filter data messages received by the respective network computer.

According to a non-limiting example, network computer 16 could be a body control module (BCM), network computer 18 could be an engine control module (ECM), network computer 20 could be an electronic brake control module (EBCM), and network computer 22 could be a transmission control module (TCM). It will be appreciated that as each of the respective network computers can serve a different vehicle function, each network computer may have some instructions unique to it. However, according to at least one example, each of the network computers 16-22 share some common instructions—i.e., the instructions exemplified by process 400 (discussed below) illustrate that each of the computers 16-22 may comprise instructions to determine whether to accept a data message based on a mode of the vehicle 12 (which mode may be determined from a security message received from gateway computer 14 and/or a type of the data message).

It will be appreciated that the quantity of five network computers (computers 16, 18, 20, 22 and gateway computer 14) are merely an example. More or fewer computers may be used in other examples. Further, the recited vehicle functions (e.g., body control, engine control, brake control, and/or transmission control) are merely examples; and other examples of computer-implemented functions also exist.

As described above, local network 30 may comprise network link 42 to interconnect computers 14-22. Network link 42 may be a wired or wireless connection associated with a local area network. For example, wired implementations include one or more of a controller area network (CAN) bus, Ethernet, Local Interconnect Network (LIN), or the like. Wireless implementations include a short-range wireless communication (SRWC) network. For example, SRWC networks may employ a Wi-Fi protocol, a Wi-Fi Direct protocol, a Bluetooth or Bluetooth Low Energy (BLE) protocol, or the like. The examples of wired and wireless network links are meant to be illustrative and non-limiting.

It will be appreciated that, in many instances, vehicle 12 may have other onboard computers which do not form part of the local network 30. For example, vehicle 12 may have multiple local networks (other than local network 30) and/or some computers may not be part of any local network onboard vehicle 12. The out-of-local-network computer 32 is illustrated as an example. For instance, computer 32 may be communicatively coupled to computer 16 but not be part of local network 30. For example, in FIG. 1, computer 32 is communicatively coupled to network computer 16 via a link 69. Thus, as used herein, a network computer (e.g., such as computers 16-22) is defined as a computer which is part of a local network (a.k.a., a local area network), and as used herein, an out-of-local-network computer (e.g., such as computer 32) is defined as a computer which is not part of the local network. While not required, a network computer may be one which is connected to a bus or wireless network that also comprises a connection to a gateway computer, whereas an out-of-local-network computer is not part of the same local network 30. However, in some examples (as indicated by the dashed lines), computer 32 may be part of a different local network (i.e., different than local network 30). One non-limiting example is that computer 32 forms part of a LIN which is distinct from local network 30. Regardless, it should be appreciated that the communication path between such computers as computer 32 and one of the network computers (e.g., network computer 16) does not typically pass through gateway computer 14. Accordingly, gateway computer 14 may be unable to monitor pass-through traffic. The process described below refers to front-door messages and back-door messages. As used herein, a front-door message is defined as a data message which comes from or passes through the gateway computer 14 and is provided to the network computers 16-22 of the local network 30 via the network link 42. And as used herein, a back-door message is defined as a data message received in any other manner (e.g., one which is received by a link such as link 69).

In general, computer 32 may have similar hardware as computers 16-22 described above. However again, it may have a different functionality.

Diagnostic port 40 may be any suitable data port that is communicatively coupled to gateway computer 14. A non-limiting example of diagnostic port 40 is an on-board diagnostics (OBD) port (e.g., OBD or OBD-II). As OBD ports are generally known in the art, these will not be described in greater detail except to note that such ports may be connected to devices having wired and/or wireless communication capability. One such example of a device that can be communicatively coupled to diagnostic port 40 is a diagnostic computing tool 70 (see FIG. 1).

As used herein, diagnostic computing tool 70 is defined as an electronic computing device capable of sending data messages through the diagnostic port 40. In some examples, diagnostic tool 70 is an authorized, original-equipment manufacturer (OEM) tool for reading data from onboard computers—such devices typically send a request (a data message) to an onboard computer (e.g., such as one of networked computers 16-22) via the diagnostic port 40 and then receive a response. For example, should such a diagnostic tool 70 request data from computer 16, the request would pass through gateway computer 14 and to network computer 16 via the network link 42. Similarly, any response from network computer 16 would pass over the network link 42, through the gateway device 14, and to the diagnostic tool 70 via diagnostic port 40. Other examples of diagnostic tool 70 include a third-party tool (e.g., used by a mechanic or technician), a dongle (which may be used by a third-party vendor to monitor vehicle information), or the like.

Figure 4:
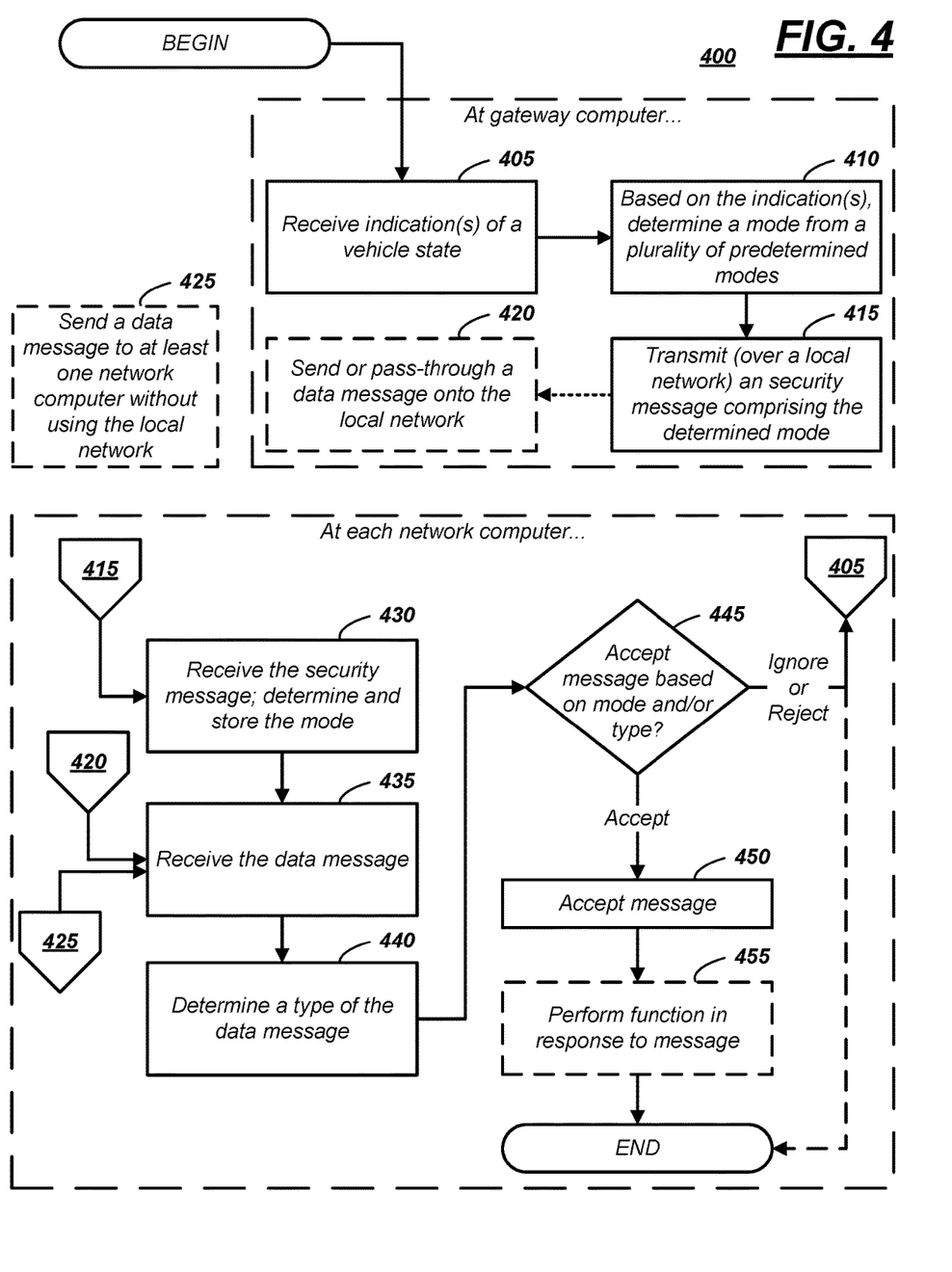
FIG. 4 is flow diagram illustrating a process of using the communication system to improve data security.

In some instances, the security of the diagnostic tool 70 may be compromised. Alternatively, in some instances, the tool 70 may be pretend to be an authorized device, but instead be used for malicious purposes (e.g., to hack or alter the performance or execution of one or more vehicle computers (e.g., such as one of network computers 16-22)). The process 400 described below explains that since the data message sent from the diagnostic tool 70 to the network computers 16-22 may be presumed to be authentic, the gateway computer 14 may be programmed to simply pass these pseudo-diagnostic messages through onto the local network 30. Accordingly, the process 400 explains how firewalls in place at the network computers 16-22 may minimize the likelihood that any malicious code carried by such pseudo-diagnostic messages are read by or executed by computers 16-22.

FIG. 4 is flow diagram(s) illustrating process 400 of using communication system 10. The process 400 comprises software instructions executable by gateway computer 14 and the plurality of network computers 16-22 (e.g., executable by the respective processor(s) of computers 14-22 and stored in respective memories of computers 14-22). Non-limiting examples of software instructions are illustrated as instructional blocks in the diagram. It will be appreciated that while not necessarily explained explicitly in process 400, other software instructions may be carried out as well.

Blocks 405-420 may be executed by gateway computer 14. Process 400 may begin at block 405, wherein gateway computer 14 receives at least one indication of a vehicle state. Non-limiting examples of the vehicle state may include whether the vehicle is stationary or moving, whether the vehicle power is ON or OFF, and predetermined use cases (vehicle is moving on an assembly-line or is at a dealership). For example, gateway computer 14 may receive an indication of whether the vehicle 12 is moving by receiving data from wheel sensors (not shown), receiving data from a transmission control module, or the like. Gateway computer 14 may receive an indication of whether the vehicle power is ON or OFF from an ignition control device (not shown) [for combustion engine vehicles], from an electronic drive unit (not shown) [for electric vehicles], or the like.

Block 410 may follow. In block 410, gateway computer 14 may determine—based on the indication(s)—a current mode of the vehicle 12. The current mode may be selected from a plurality of predetermined modes that correspond with a state of the vehicle 12. Table I illustrates exemplary modes and that the modes may be assigned a unique identifier (e.g., 1, 2, 3, 4). For example, a first mode may refer to a scenario when the vehicle is stationary (e.g., in PARK), the power is ON, and the doors are in an unlocked state. A second mode may refer to a scenario when the vehicle is moving (e.g., in DRIVE or REVERSE) and the power is ON. A second mode may refer to a scenario when the vehicle is stationary (e.g., in PARK) and the power is OFF. And a fourth mode may refer to a scenario that is a predetermined use case. Non-limiting examples of a predetermined use case comprise a grace period state or an in-motion state. For example, a grace period state may be a state that permits certain engineering testing messages, calibration messages, etc. to pass through the gateway computer 14 to the respective network computers 16-22 (and which the respective network computers 16-22 may accept and, if necessary, send a response). The grace period state may serve as a temporary override—e.g., permitting data messages to pass from the diagnostic port 40 through the gateway computer 14 and to the network computers 16-22 in scenarios which this would otherwise be precluded (e.g., including instances where the vehicle is in motion). Examples of use cases which may utilize the grace period state include a customer flight recorder use case, a 360-degree camera calibration use case, an Adaptive Cruise Control use case, a lane departure system use case, a wheel alignment use case, and a headlamp aim use case, just to name a few examples. An in-motion state may comprise the vehicle being in motion—e.g., to enable operability of assembly-line tools during manufacturing or to enable operability of technician tools at a vehicle dealership, wherein operability includes communicating with at least one of the plurality of network computers. It will be appreciated that—throughout process 400—gateway computer 14 continuously or repeatedly may monitor indication(s) of the vehicle state and based thereon, accordingly determine an updated current mode.

TABLE I

| Current Mode | Vehicle State | Message Type | Instructions stored at network computer |
|---|---|---|---|
| 1 | vehicle is stationary, power ON | Diagnostic (any) | Accept |
| 1 | vehicle is stationary, power ON | Operational (any) | Accept |
| 1 | vehicle is stationary, power ON | OTVP (any) | Accept |
| 1 | vehicle is stationary, power ON | Network management (any) | Accept |
| 2 | vehicle is moving, power ON | Diagnostic read-out only | Accept |
| 2 | vehicle is moving, power ON | Diagnostic all-except read-out only | Ignore |
| 2 | vehicle is moving, power ON | Operational (any) | Accept |
| 2 | vehicle is moving, power ON | OTVP (any) | Accept |
| 2 | vehicle is moving, power ON | Network management (any) | Accept |
| 3 | vehicle is stationary, power OFF | Diagnostic read-out only OR new program key | Accept |
| 3 | vehicle is stationary, power OFF | Diagnostic all-except read-out only | Reject |
| 3 | vehicle is stationary, power OFF | Operational read-out only OR new program key | Accept |
| 3 | vehicle is stationary, power OFF | Operational all-except read-out only | Reject |
| 3 | vehicle is stationary, power OFF | OTVP read-out only OR new program key | Accept |
| 3 | vehicle is stationary, power OFF | OTVP all-except read-out only | Reject |
| 3 | vehicle is stationary, power OFF | Network management read-out only OR new program key | Accept |
| 3 | vehicle is stationary, power OFF | Network management all-except read-out only | Reject |
| 4 | predetermined use case | Diagnostic predetermined use case | Accept |
| 4 | predetermined use case | Diagnostic all-except predetermined use case | Reject |
| 4 | predetermined use case | Operational (any) | Reject |
| 4 | predetermined use case | OTVP (any) | Reject |
| 4 | predetermined use case | Network management (any) | Reject |

In block 415, which follows block 410, gateway computer 14 may transmit a security message to each of the network computers 16-22 (of the local network 30) via the network link 42. The security message may comprise the current mode. According to one example, a header or footer of the security message has an identifier which—when received by the network computers 16-22—enable each computer to accept the security message. For example, it will be appreciated that a data message may comprise a header, a payload, and sometimes a footer, wherein the payload is appended to the header, and, if present, the footer is appended to the payload. Typically, the header or footer comprises identifiers which enable the recipient computer to determine whether to accept the data message.

As explained more below, block 420 (executed by gateway computer 14) occurs after block 430 (executed at each of network computers 16-22). In block 420, the gateway computer 14 may send or pass-through a data message to the rest of the local network 30 (e.g., onto the network link 42). In some examples, the data message may be received via the diagnostic port 40 (and/or from diagnostic tool 70). For example, a header of the data message may indicate to the gateway computer 14 that the data message pertains to diagnostics. In other examples, the data message may be generated by gateway computer 14 or some other onboard computer communicatively coupled to gateway computer 14. As discussed above, the gateway computer 14 may be unable to determine whether the data message is genuine in all instances. Thus, in at least some examples, the data message may be a pseudo-diagnostic message—e.g., from a malicious source.

Block 425 may be executed by another computer which may or may not be part of vehicle 12. Like block 420, it occurs after block 430 (which is executed by each of the network computers 16-22). According to at least one example, block 425 is executed by the out-of-local-network computer 32 sending a data message to network computer 16 via link 69. Other examples also exist.

Turning now to blocks 430-455, these blocks are executed by each of the network computers 16-22. However, for simplicity sake, blocks 430-455 will be described with respect to only one (e.g., network computer 16) although blocks 430-455 are carried out by each of network computers 16-22.

In block 430, network computer 16 receives the security message sent by the gateway computer 14 (sent in block 415). Network computer 16 determines (e.g., extracts gateway computer 14 mode from the received signal) the current mode from the data message (e.g., from the header or footer) and stores it in memory 62.

In block 435 which follows, network computer 16 receives the data message either from gateway computer 14 (sent according to block 420) or from the out-of-local-network computer 32 (sent according to block 425). As used herein, 'receiving a data message' is defined as the data message being delivered to a network computer and the network computer determining at least one identifier from the data message without reading a payload of the data message, without storing any of the payload message in the network computer's respective memory, and without executing any data stored in the payload of the data message. For example, receiving a data message may include reading a header or footer of the data message and/or determining an identifier in the header and/or footer.

The header or footer may contain an identifier indicating a data message type—e.g., such as a diagnostic (any) type, an operational (any) type, an on-vehicle telematics protocol (OVTP) (any) type, a network management (any) type, a diagnostic read-out only type, a diagnostic all-except read-out only type, a new program key type, an operational read-out only type, an operational all-except read-out only type, an OTVP read-out only type, an OTVP all-except read-out only type, a network management read-out only type, a network management all-except read-out only type, a diagnostic predetermined use case type, or a diagnostic all-except predetermined use case type.

A diagnostic (any) type refers to any diagnostic classification (e.g., including types that are Unified Diagnostic Services (UDS) messages), wherein UDS messages are known in the art. An operational (any) type refers to messages pertaining to vehicle control signals that control vehicle acceleration, deceleration or braking, and/or vehicle steering (e.g., vehicle speed, ignition state, gear selector status, and the like). An OVTP (any) type refers to any intra-vehicle communication signals (e.g., those pertaining to the local network 30 and other in-vehicle networks). A network management (any) type refers to any control signals for vehicle electronic control units (ECUs) when the vehicle 12 state is OFF (unpowered) and include ECU control signals regarding vehicle-wake-up protocols to gather vehicle information or activate a customer driven feature that require information from another ECU and/or vehicle-sleep protocols that delay or inhibit power-down of some vehicle computers that require information from another vehicle computer upon initiation of a vehicle OFF state.

Read-out only types (e.g., diagnostic read-out only type, an operational read-out only type, an OVTP read-out only type, or a network management read-out only type) refer to data message types requesting only read-out information from a particular vehicle computer (e.g., such as requesting information from one of network computers 16-22) (e.g., this data message type only requests that the network computer transmit read data to the requesting diagnostic tool 70; e.g., it does not command the respective network computer to do anything else). All-except read-out only types (e.g., (e.g., diagnostic all-except read-out only type, an operational all-except read-out only type, an OTVP all-except read-out only type, or a network management all-except read-out only type) refer to data message types that include anything other than simply reading out data (e.g., this could include commands, run-sequences, calibrations, reconfigurations, reprogramming, etc.). Further, all-except read-out types can include read-out data plus something other than read-out data.

A new program key type refers to programming a new vehicle ignition or other start-up key. And as the name suggests, a diagnostic predetermined use case type refers to a message requesting data regarding a predetermined (e.g., pre-programmed) use case or executing a pre-programmed use case for one or more network computers (this may include diagnostic read-out messages). And a diagnostic all-except predetermined use case type refers to any diagnostic messages other than one directed to the predetermined use case.

In block 440 which follows, the respective network computer (16) that received the data message in block 435 determines a type of the data message. Again, the type may be determined from an identifier in a header or footer of the data message. Table I and the previous description of types of data messages list examples. Still other examples of message types also exist.

In block 445, network computer 16 determines whether to accept the data message based on the current mode and the data message type. Table I illustrates non-limiting examples whether the data message is accepted or not—based on the current mode and type. As used herein, 'accepting a data message' is defined as the network computer (which received the data message) reading a payload of the data message, storing at least a portion of the payload message in the network computer memory 62, and/or executing any data stored in the payload of the data message. When a data message is accepted, process 400 may proceed to block 450. And when the data message is not accepted (e.g., it is to be ignored or rejected), process 400 may proceed to block 405 (or any other suitable instructional block). In this latter instance, process 400 may be looping back and repeating at least a portion of the process.

In block 450, network computer 16 accepts the message. And in block 455 which follows, network computer 16 may perform or otherwise execute a vehicle function in response to the data message. In some examples, a single data message may be sufficient to perform the vehicle function. In other examples, the payloads of multiple data messages may need to be received first before the network computer 16 reconstructs a command and can execute a vehicle function. Further still, in some examples, block 455 is omitted (e.g., 455 is optional).

Following block 455, the process may end. Alternatively, process 400 may loop back and repeat at least a portion of the process (e.g., beginning again at block 405 or some other block). Typically, process 400 is performed iteratively during an ignition cycle (e.g., a power ON state).

Other examples of process 400 also exist. For example, gateway computer may store and execute firewall program that scans incoming data messages and only passes to network computers 16-22 data messages which are scanned and pass a predetermined firewall security protocol.

It should be appreciated that process 400 provides multiple layers of data security. For example, with respect to front-door messages (those passed through the gateway computer 14), the gateway computer 14 may utilize a firewall and inhibit some undesirable data messages from ever reaching the network computers 16-22. Further, regardless of whether a front-door message or a back-door message (e.g., such as those which may be provided via out-of-local-network computer 32) is delivered to network computers 16-22, each of the network computers 16-22 may apply a second line of defense against potentially undesirable data messages. For example, each network computer 16-22 may receive the data message, determine a type of the data message, determine the current mode (which is updated by the gateway computer 14) and determine whether to accept the data message based on the current mode and the type.

Thus, there has been described a vehicle communication system that includes a gateway computer, a plurality of network computers, and a network link that communicatively couples the gateway computer to the plurality of network computers. The gateway computer may determine a current mode for purposes of passing through data messages to the network computers, and the network computers may store this current mode. The gateway computer may filter some messages (e.g., not permitting them to pass through). In some examples, the gateway computer may pass-through data messages to the network computers, and the network computers may determine whether to accept the data message based on a type of the message and the current mode.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising: a plurality of network computers for different vehicle operations communicatively coupled to a gateway computer and one another via a local network in a vehicle, wherein each of the plurality of network computers comprise: one or more processors; and memory storing first instructions executable by the one or more processors, the first instructions comprising instructions to: receive, via the local network, a security message from the gateway computer that identifies a current vehicle state; receive a data message; and based on the current vehicle state, determine whether to accept the data message; accept the data message upon determining that the type is a specified diagnostic type and the vehicle state includes a grace period state, the grace period state being a state in which the vehicle is in motion and specified data messages are permitted to pass from a diagnostic port through a gateway computer to the respective network computers that would otherwise be precluded for the current vehicle state.

2. A method, comprising: receiving, respective network computers for different vehicle operations, a security message from a gateway computer; receiving, at the network computers, a data message; and based on the current vehicle state, determining, at the network computers, whether to accept the data message; and accepting the data message, at the network computers, upon determining that the type is a specified diagnostic type and the vehicle state includes a grace period state, the grace period state being a state in which the vehicle is in motion and specified data messages are permitted to pass from a diagnostic port through a gateway computer to the respective network computers that would otherwise be precluded for the current vehicle state.

3. The method of claim 2, wherein the type of the data message is selected from a group including: a diagnostic (any) type, an operational (any) type, an on-vehicle telematics protocol (OVTP) (any) type, a network management (any) type, a diagnostic read-out only type, a diagnostic all-except read-out only type, the new program key type, an operational read-out only type, an operational all-except read-out only type, an OVTP read-out only type, an OVTP all-except read-out only type, a network management read-out only type, a network management all-except read-out only type, a diagnostic predetermined use case type, or a diagnostic all-except predetermined use case type.

4. The method of claim 2, wherein the current vehicle state is indicated by a current mode that is one of a plurality of predetermined modes.

5. The method of claim 4, further comprising accepting, at the network computers, the data message when the type is one of a diagnostic (any) type, a diagnostic read-out only type, or a diagnostic predetermined use case type regardless of the current mode.

6. The method of claim 2, wherein receiving the data message comprises reading a header or footer of the data message.

7. The method of claim 2, wherein determining to accept the data message comprises reading a payload of the data message, storing at least a portion of the payload message, executing data stored in the payload of the data message, or a combination thereof.

8. The method of claim 4, further comprising receiving, in the gateway computer, at least one indication regarding whether the vehicle is stationary or moving and whether vehicle power is ON or OFF; determining the current mode based on the at least one indication; and providing, to the plurality of network computers, the security message which includes the current mode.

9. The method of claim 2, further comprising receiving the data message in a communication device; and passing through the data message to the network computers.

10. The system of claim 1, wherein the current vehicle state is indicated by a current mode that is one of a plurality of predetermined modes.

11. The system of claim 1, wherein a communication device is communicatively coupled to the local network via a diagnostic port for communications with the gateway computer including the security message.

12. The system of claim 1, wherein the type of the data message is selected from a group including: a diagnostic (any) type, an operational (any) type, an on-vehicle telematics protocol OVTP (any) type, a network management (any) type, a diagnostic read-out only type, a diagnostic all-except read-out only type, the new program key type, an operational read-out only type, an operational all-except read-out only type, an OVTP read-out only type, an OVTP all-except read-out only type, a network management read-out only type, a network management all-except read-out only type, a diagnostic predetermined use case type, or a diagnostic all-except predetermined use case type.

13. The system of claim 10, wherein the first instructions further comprise instructions to accept the data message when the type is one of a diagnostic (any) type, a diagnostic read-out only type, or a diagnostic predetermined use case type regardless of the current mode.

14. The system of claim 1, wherein receiving the data message comprises to: read a header or footer of the data message.

15. The system of claim 1, wherein determining to accept the data message comprises to: read a payload of the data message, store at least a portion of the payload message, execute data stored in the payload of the data message, or a combination thereof.

16. The system of claim 10, wherein the first instructions further comprise instructions to: determine that the current mode indicates that the vehicle is stationary and that vehicle power is ON; determine that the type is a diagnostic (any) type, an operational (any) type, an on-board vehicle telematics protocol OVTP (any) type, or a network management (any) type; and then accept the data message.

17. The system of claim 10, further comprising the gateway computer, wherein the gateway computer comprises: one or more second processors; and second memory storing second instructions executable by the one or more second processors, the second instructions comprising instructions to: receive at least one indication regarding whether the vehicle is stationary or moving and whether vehicle power is ON or OFF; determine the current mode based on the at least one indication; and provide, to the plurality of network computers, the security message which includes the current mode.

18. The system of claim 17, wherein the second instructions further comprise instructions to: receive the data message from a communication device; and pass-through the data message to the plurality of network computers.

19. The system of claim 18, wherein the second instructions further comprise instructions to: before passing-through the data message, scan the data messages using a firewall program stored in second memory of the gateway computer.

20. The method of claim 2, wherein a communication device is communicatively coupled to the local network via a diagnostic port for communications with the gateway computer including the security message.

* * * * *